(No Model.)

H. ZWANZIGER.
SEAL.

No. 371,910. Patented Oct. 18, 1887.

Witnesses
Edmund Jepsen
Otto Schiffer

Inventor
Heinrich Zwanziger

UNITED STATES PATENT OFFICE.

HEINRICH ZWANZIGER, OF VIENNA, AUSTRIA-HUNGARY.

SEAL.

SPECIFICATION forming part of Letters Patent No. 371,910, dated October 18, 1887.

Application filed December 8, 1886. Serial No. 221,029. (No model.) Patented in Austria-Hungary December 20, 1886, No. 29,556 and No. 63,148.

*To all whom it may concern:*

Be it known that I, HEINRICH ZWANZIGER, a subject of the Emperor of Austria, residing at Vienna, Austria-Hungary, have invented a new and useful Seal, (for which I have obtained a patent in Austria-Hungary, No. 29,556 and No. 63,148, bearing date December 20, 1886,) of which the following is a specification.

The seals used hitherto are objectionable for the reason that the inner surfaces between which are situated the seal strips or knots are more or less plain, so that when pressed together in a cold state it is impossible to connect them so closely as is desirable for the safety of the seal. Therefore it often happened that such seals have been opened by persons not entitled to do so, and who closed the seals after having misused them.

The object of this invention is to prevent this misuse, and is effected by producing seals with ribbed or toothed surfaces or edges—that is to say, the inner surfaces or edges of the two disks between which the seal strip or knot is to be placed are provided with teeth or ribs, so that by pressing the seal said teeth or ribs of the one disk enter the recesses of the other disk and effect a kind of gearing which makes it impossible to open the seal without injuring the same.

A seal constructed according to this invention is represented in the annexed drawings.

Figure 1:
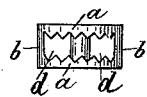
Figure 3:
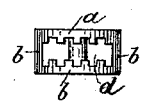
Figure 6:
Figure 5:
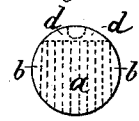
Figure 2:
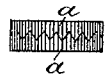
Figure 4:

Figure 1 represents the said seal with triangular teeth or ribs in an open state, and Fig. 2 in a pressed state. Fig. 3 is a seal with rectangular teeth or ribs in an open, and Fig. 4 in a closed, state. Figs. 5 and 6 represent such a seal in a view from above and in a side view.

The seals used hitherto consist of the two disks $a\ a$, held together by strips or ribs $b$. These ribs $b$ allow a sufficient opening at $c$ to insert the seal strip or knot, and on the other side are two holes or notches, $d$, for pulling in both ends of said strip. The inner surfaces of the two disks were hitherto plain. In the new seals the same are toothed or ribbed to effect a close connection. The teeth or ribs may be of any shape. However, it is preferable to employ rectangular teeth, (shown in Figs. 3 and 4,) because by pressing together said teeth a jumping of the same takes place. The ends of the cord are also so strongly pressed into the lead that they are secured in place without making a knot.

Having fully described my invention, what I desire to claim and secure by Letters Patent is—

A seal composed of two disks the inner or uniting edges of which are provided with teeth or projections, which teeth, when said disks are pressed together, engage upon the seal-strip and firmly secure the same, substantially as described.

In testimony whereof I have signed my name to this specification in the presence of two subscribing witnesses.

HEINRICH ZWANZIGER.

Witnesses:
   EDMUND JUSSEN,
   OTTO SCHIFFER.